(12) United States Patent
Casciotti et al.

(10) Patent No.: US 10,030,839 B2
(45) Date of Patent: Jul. 24, 2018

(54) BACKLIT, LASER ENGRAVED METALIZED PROMOTIONAL ITEMS

(71) Applicant: Amsterdam Printing & Litho, Inc., Amsterdam, NY (US)

(72) Inventors: David Casciotti, Amsterdam, NY (US); Jing Mahler, Glenville, NY (US); Darren Costelloe, Albany, NY (US); Jianhua Luo, Hangzhou (CN)

(73) Assignee: Amsterdam Printing & Litho, Inc., Amsterdam, NY (US)

( * ) Notice: Subject to any disclaimer, the term of this patent is extended or adjusted under 35 U.S.C. 154(b) by 0 days.

(21) Appl. No.: 15/353,007

(22) Filed: Nov. 16, 2016

(65) Prior Publication Data
US 2018/0135829 A1 May 17, 2018

(51) Int. Cl.
| | |
|---|---|
| *F21V 3/04* | (2006.01) |
| *F21L 4/00* | (2006.01) |
| *B43K 29/10* | (2006.01) |
| *F21Y 115/10* | (2016.01) |

(52) U.S. Cl.
CPC ............ *F21V 3/0436* (2013.01); *B43K 29/10* (2013.01); *F21L 4/00* (2013.01); *F21Y 2115/10* (2016.08)

(58) Field of Classification Search
CPC .... B43K 29/10; B43K 27/006; B43K 29/007; F21V 3/0436
USPC ........................................ 401/192, 194, 195
See application file for complete search history.

(56) References Cited

U.S. PATENT DOCUMENTS

| | | | |
|---|---|---|---|
| 3,333,095 A | 7/1967 | Moess | |
| 4,016,414 A | 4/1977 | Browning et al. | |
| 4,518,274 A | 5/1985 | Hanggi | |
| 5,105,343 A | 4/1992 | Wakimoto | |
| 6,180,048 B1 * | 1/2001 | Katori ................ | H01H 9/182 264/132 |
| 6,299,372 B1 * | 10/2001 | Wang .................. | B43K 29/10 362/118 |
| 6,419,306 B2 * | 7/2002 | Sano ................... | B60Q 1/323 296/209 |
| 6,761,468 B1 | 7/2004 | Bogal | |
| 7,419,275 B2 | 9/2008 | Huang | |

(Continued)

FOREIGN PATENT DOCUMENTS

| | | |
|---|---|---|
| JP | 3172555 U | 12/2011 |
| KR | 10-2009-0028381 A | 3/2009 |

OTHER PUBLICATIONS

Search Report and Written Opinion dated Mar. 30, 2018 for PCT Application No. PCT/US2017/062034, 15 pages.

*Primary Examiner* — Jon-Suk (James) Lee
*Assistant Examiner* — Christopher E Dunay
(74) *Attorney, Agent, or Firm* — Patterson Thuente Pedersen, P.A.

(57) ABSTRACT

Promotional items with enhanced advertising messaging. More specifically, embodiments are directed to a metallic-finished promotional item with a laser-engraved message that is illuminated or backlit by incorporating a light source into the promotional item. The light source acts to illuminate or brighten the laser-engraved message when the light source is powered on. Furthermore, according to embodiments, when the light source is not in use, the laser-engraved message remains appealing, hereinafter referred to "daylight appeal", due to its enhanced contrast with the surrounding metallic finish.

28 Claims, 6 Drawing Sheets

(56) References Cited

U.S. PATENT DOCUMENTS

| | | | |
|---|---|---|---|
| 9,315,067 B2 | 4/2016 | Chauvin, II | |
| D782,578 S * | 3/2017 | Casciotti | D19/199 |
| 2004/0075998 A1* | 4/2004 | Su | B43K 29/10 |
| | | | 362/118 |
| 2004/0161288 A1 | 8/2004 | Tsai et al. | |
| 2004/0264163 A1* | 12/2004 | Fang | B43K 29/10 |
| | | | 362/616 |
| 2005/0019088 A1* | 1/2005 | Holland | B43K 7/005 |
| | | | 401/192 |
| 2005/0186336 A1* | 8/2005 | Su | B43K 19/02 |
| | | | 427/202 |
| 2005/0207822 A1* | 9/2005 | Wang | B43K 7/005 |
| | | | 401/193 |
| 2005/0254230 A1 | 11/2005 | Fang | |
| 2006/0209560 A1* | 9/2006 | Fang | B43K 29/007 |
| | | | 362/579 |
| 2007/0020022 A1* | 1/2007 | Herrmann | A45D 40/20 |
| | | | 401/88 |
| 2007/0077111 A1* | 4/2007 | Qiu | B29C 45/1676 |
| | | | 401/6 |
| 2007/0177369 A1* | 8/2007 | Kira | G01D 13/12 |
| | | | 362/23.01 |
| 2008/0165524 A1* | 7/2008 | Huang | B43K 23/12 |
| | | | 362/118 |
| 2009/0285620 A1* | 11/2009 | Tung | B43K 5/005 |
| | | | 401/195 |
| 2010/0098478 A1* | 4/2010 | Liu | B43K 7/005 |
| | | | 401/110 |
| 2011/0215366 A1* | 9/2011 | Tsukagoshi | H01L 33/62 |
| | | | 257/99 |
| 2012/0237725 A1* | 9/2012 | Stossel | B60R 13/02 |
| | | | 428/139 |
| 2012/0313392 A1* | 12/2012 | Bingle | B60R 13/005 |
| | | | 296/1.08 |
| 2015/0049459 A1* | 2/2015 | Peeters | H01L 25/0753 |
| | | | 362/84 |
| 2015/0290964 A1* | 10/2015 | Chauvin, II | B43K 29/10 |
| | | | 401/116 |

* cited by examiner

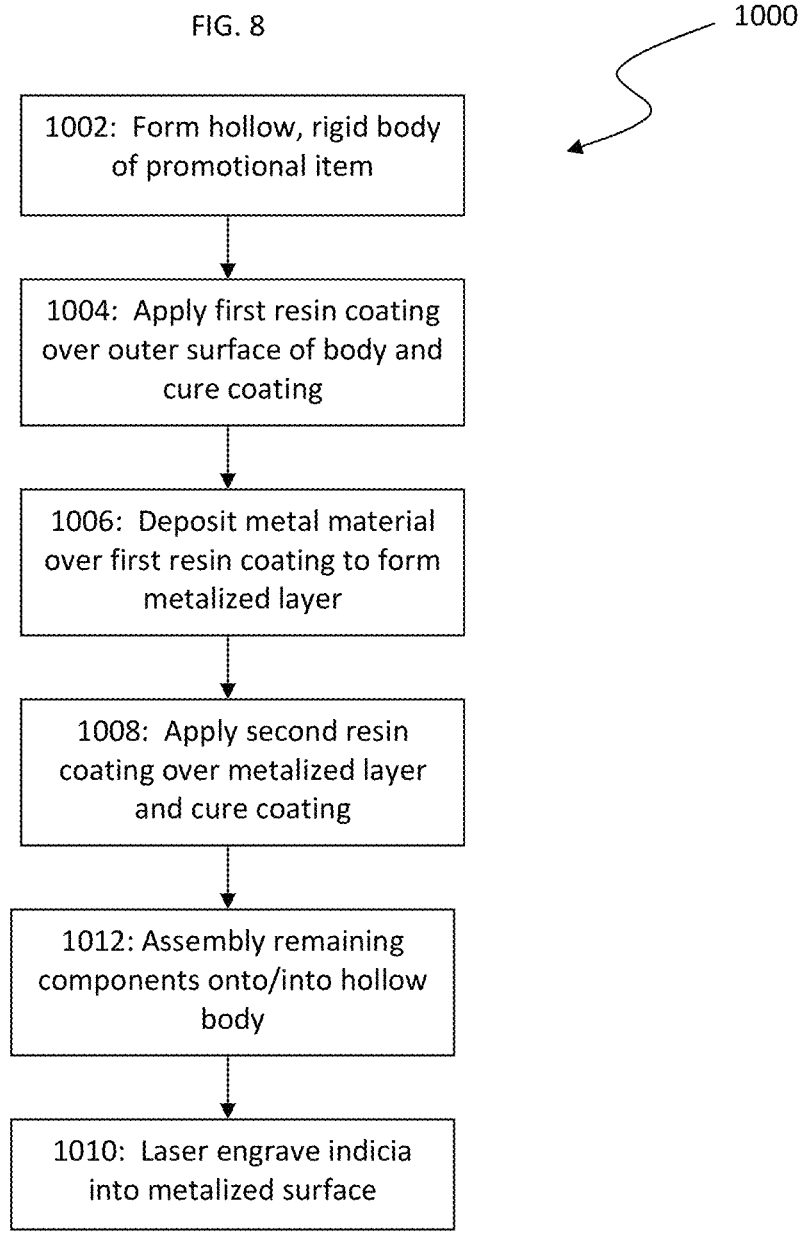

BACKLIT, LASER ENGRAVED METALIZED PROMOTIONAL ITEMS

FIELD OF TECHNOLOGY

Embodiments of the invention relate generally to promotional products, and more specifically to illuminated and backlit laser-engraved metalized promotional products with an enhanced functionality of advertising messaging.

BACKGROUND

Promotional items or products are articles of merchandise that are used in marketing and communication programs. They are typically given away or provided to promote a product, service, company, corporate image, brand, and/or event. Promotional products are a relatively simple and economic way to raise customer awareness of a product or brand, to present information to consumers and others, to increase demand of a product or service advertised by the promotional product, and/or to differentiate the promotional product from other products in the marketplace.

Promotional products can come in any of a variety of forms, and are often branded with a logo, slogan, and/or other information to promote the product, service, company, corporate image, brand, or event. Promotional products can include, for example, functional items such as writing instruments including pens and styluses, key chains, night lights, mini-flashlights or penlights, portable power banks, or any of a variety of useful items. Generally, the promotional item is pocket-sized, such that it fits easily into a pocket or purse, with the intent that the intended recipient uses the item frequently, which, in turn, increases awareness of the promotional message by the recipient.

However, often times the functionality of the promotional items outperforms the desired promotional advertising effect. For example, the recipient may use a pen a number of times, without awareness or noticing the promotional message after the first few uses. In other circumstances, the promotional item may have limited or short-term functionality such that the recipient only uses the item a few times before discarding the item, thereby limiting the awareness of the promotional advertising message.

There remains a need for items having an enhanced advertising message for increased awareness of the message by the recipient to ultimately drive demand.

SUMMARY

Embodiments are directed to promotional items with enhanced advertising messaging. More specifically, embodiments are directed to a metallic-finished promotional item with a laser-engraved message that is illuminated or backlit by incorporating a light source into or onto the promotional item. The light source acts to illuminate or brighten the laser-engraved message when the light source is powered on. Furthermore, according to embodiments, when the light source is not in use, the laser-engraved message remains appealing, hereinafter referred to "daylight appeal", due to its enhanced contrast with the surrounding metallic finish.

In an embodiment, a promotional item includes a hollow or partially filled body or barrel formed of a transparent or translucent plastic material and having a pocket or other interior housing for a light source, a metalized outer surface which is laser engraved, and a light source contained with the body, the light source being shiftable between an "on" and "off" setting. A metalized surface is herein defined as a surface made up of one or more layers that appears as if formed from metal and imparts a metalized appearance to a substrate, regardless of whether it contains metal or metal containing materials. In certain embodiments, the metalized surface can comprise an assembly of coatings including one or more first coating(s) on an outer facing surface of the plastic substrate, a continuous metallic surface, such as a vacuum-deposited aluminum layer, overlaying the first coating(s), and one or more pigmented coatings overlaying the metallic surface to impart one or more colors to the metallic surface.

The metalized surface is laser engraved with the desired engravings, such as logos, brand names, images, information such as telephone numbers, addresses, websites, dates, or any of a variety of text and/or images. The metalized surface is engraved such that the pigmented layer(s), vacuum-deposited metallic surface, and an upper portion of the clear coating are breached or cut away to reveal the underlying plastic substrate while leaving the plastic substrate intact so as not to compromise the structural integrity of the hollow or partially filled body.

The contrast between the exposed plastic substrate and the metallic surface provides a sharp and crisp advertising or promotional message to the recipient. Furthermore, when the light source is powered on, the light backlights the exposed portion of the plastic substrate to further enhance the appearance and noticeability of the promotional message by providing further contrast between the exposed plastic substrate and the metallic surface.

In certain embodiments, one or more whitening additive(s), such as titanium dioxide ($TiO_2$) and/or other optical brightening agent(s), are added to the plastic substrate. The whitening or optical brightening additive(s) helps provide further contrast between the exposed plastic substrate and the metallic surface to enhance the promotional message when the light source is powered off. Furthermore, the additive can provide flame retardant properties to the plastic substrate to eliminate or reduce the occurrence of charring and/or bubbling of the plastic substrate due to heat generated during laser engraving.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 8 is a flow chart depicting a method of making a laser-engraved promotional item according to an embodiment of the invention.

Figure 1:
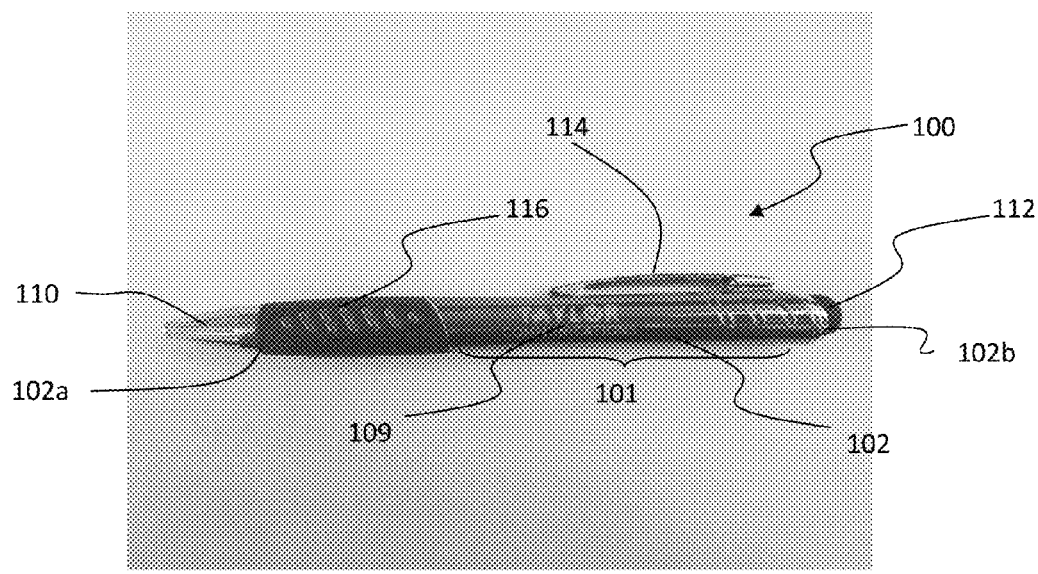
FIG. 1 is a perspective view of a metalized, laser-engraved promotional stylus pen with a light source according to an embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

According to embodiments, promotional products can come in any of a variety of forms, and are often branded with a logo, slogan, and/or other information to promote the product, service, company, corporate image, brand, or event. Promotional products can include, for example, functional or non-functional items such as writing instruments including pens and styluses, stylus pens, highlighters, key chains, night-lights, mini-flashlights or penlights, portable power banks, phone or smart device chargers, or any or any of a variety of useful items. Generally, the promotional item is pocket-sized, such that it fits easily into a pocket or purse, with the intent that the recipient uses the item frequently, which increases awareness of the promotional message by the recipient.

Figure 2:
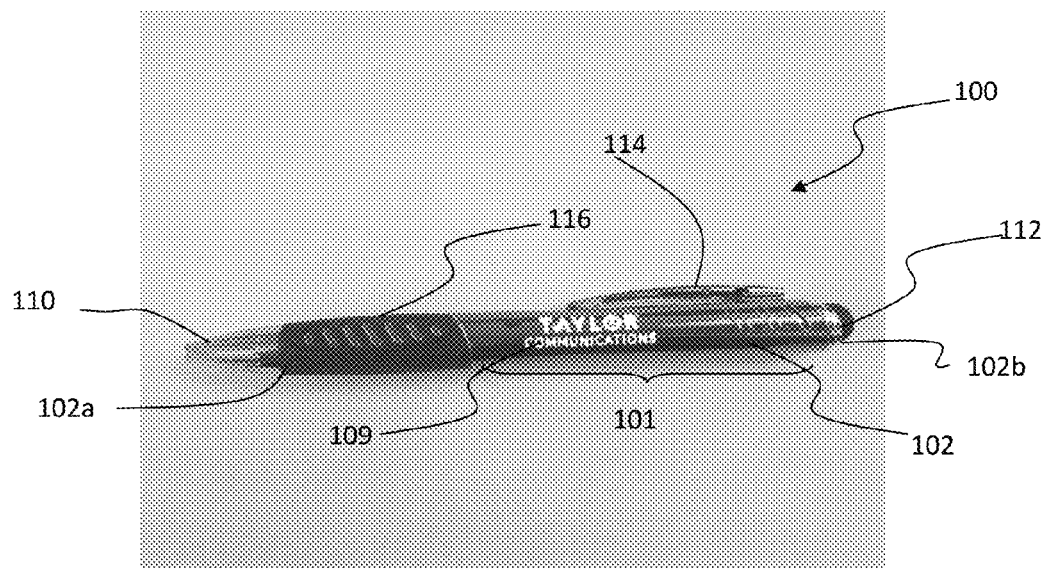
FIG. 2 is a perspective view of the promotional stylus pen of FIG. 1 with the light source illuminated.
Figure 3:
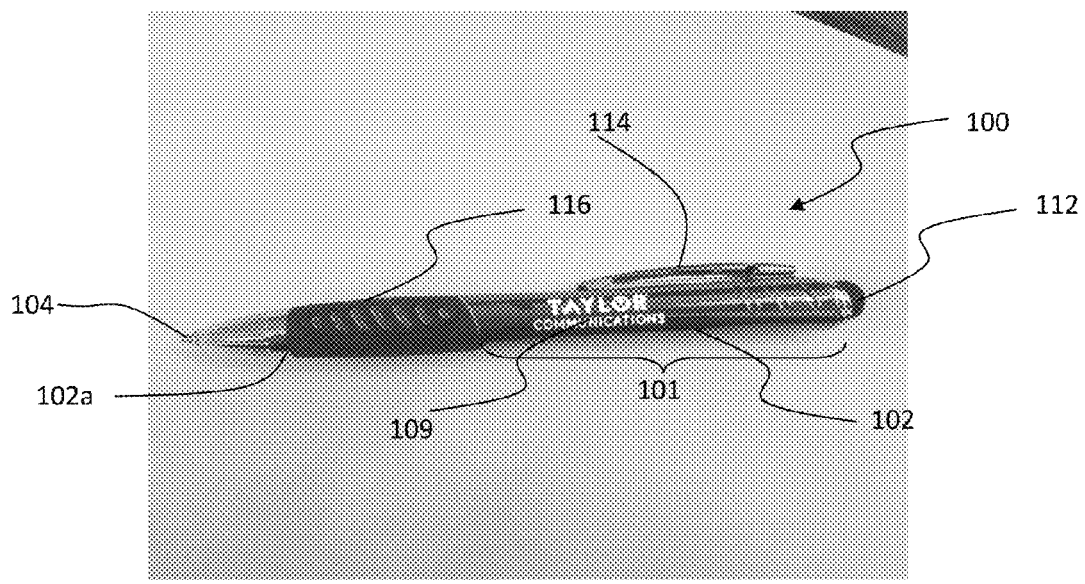
FIG. 3 is a perspective view of the promotional stylus pen of FIG. 1 with the light source illuminated, and a writing tip in an extended, usable position.

Referring now to FIGS. 1-3, according to an embodiment, a promotional item 100 comprises a pen having a laser-engraved metalized outer surface 101. Item 100 generally comprises a hollow barrel 102 having a first, proximal end 102a, and a second distal end 102b. Proximal end 102a can comprise an optional extension or nib 110 coupled to proximal end 102a through which a writing tip 104 can extend for writing on a surface. Writing tip 104 can be operably coupled to a conventional ink source and cartridge assembly (not shown), which is contained within the interior of barrel 102. Writing tip 104 can be extended from the interior of hollow barrel 102 by applying force to distal end 102b or a button form on barrel 102, or by rotating extension 110 relative to and about a longitudinal axis of barrel 102, as depicted in FIG. 3.

Distal end 102b can comprise a stylus 112 for use on a capacitive touch screen, such as a smart phone or tablet. Alternatively, distal end 102b can comprise any of a variety of buttons, plungers, erasers, styli, carabineers, clips, or a smart phone stand. Pen 100 can further comprise an optional clip 114, rubber grip 116, or any combination of features.

Figure 1A:
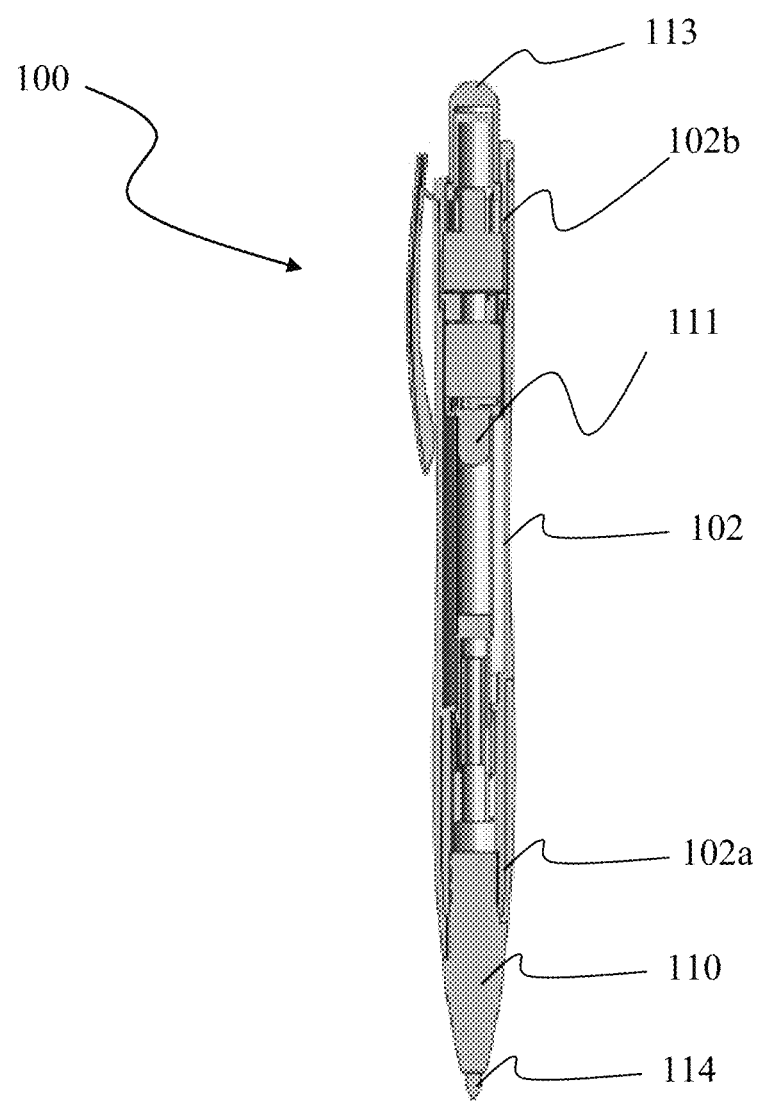
FIG. 1A is a cross-sectional view of the metalized, laser-engraved promotional stylus pen with a light source of FIG. 1.

Referring to FIG. 1A, item 100 further comprises a light source 111 housed within barrel 102, for example, adjacent to distal end 102b, proximal end 102a, or both. The light source can be LED, fiber optic, incandescent, fluorescent, ultra-violet, or any of a variety of light sources. The light source is shiftable between an "off" position in which the light source is not illuminated, and an "on" position in which the light source is illuminated. For example, when positioned proximate distal end 102b, the light source is powered on and off by depressing a depressable surface 113, such as a button, plunger, stylus, or otherwise, coupled to distal end 102b. In other embodiments, the light source, once powered on, flashes on and off until powered down or off. The light source can be battery powered, AC powered, or a combination of both.

In embodiments, barrel 102 is formed of a rigid thermoplastic or thermoset material, such as, for example, but not limited to, acrylonitrile butadiene styrene (ABS), acrylonitrile styrene (AS), cellulose acetate butyrate (CAB), polycarbonate (PC), polyethylene terephthalate (PET), polyethylene (PE) including high density polyethylene (HDPE) and low density polytethylene (LDPE), polyvinyl chloride (PVC), polypropylene (PP), polystyrene (PS), or combinations thereof, such as PC/ABS plastics. Barrel 102 can be injection or blow molded, or can be extruded to form the hollow member. Preferably barrel 102 is transparent or translucent.

Figure 7:
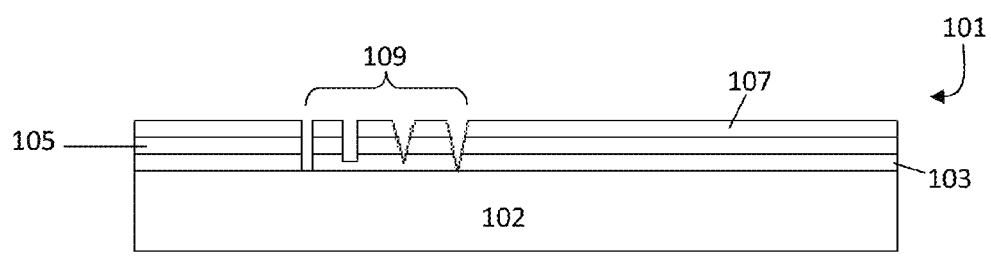
FIG. 7 is a cross-section depicting a laser-engraved metalized portion of a promotional item according to an embodiment of the invention.

Barrel 102 further comprises a laser-engraved metalized surface 101 formed over at least a portion of an outer surface of barrel 102. Referring now to FIG. 7, metalized surface 101 is formed over barrel 102, and generally comprises first coating(s) 103, a continuous metalized layer 105, and one or more pigmented top layers 107 for imparting color to the metalized surface. Laser-engravings 109 are formed in metalized surface 101 and extend through the entirety of top layer(s) 107, metalized layer 105, and at least partly into or fully through first coating(s) 103, so that the plastic material of barrel 102 is at least partially viewable or exposed through first coating(s) 103. Laser-engravings 109 can be flat-bottomed or peak, as depicted in FIG. 7, depending on the laser settings. Laser-engravings 109 can include, for example, brand names, individual names, company names, logos, images, information such as telephone numbers, addresses, web sites, dates, or any of a variety of text and/or images.

First coating(s) 103 can comprise, for example, a transparent or translucent resin, such as, for example, a catalyst cured resin, a solvent based resin, a heat cured resin, and/or a radiation cured resin including, for example, a UV, e-beam, or other radiation curable resins or coatings. First coating(s) 103 acts as both a protective layer over barrel 102, and can also serve as a primer layer for bonding metalized layer 105 to barrel 102. First coating(s) 103 can optionally include one or more whitening agent(s), such as a fluorescent whitener, in an amount of from about 1 to 8 weight %, and more particularly, from about 2.5 to 6.5 weight percent, and even more particularly about 4.5 weight %. The whitening agent enhances the daylight effect of the engraving (i.e. the appearance of the engraving when the light source is not illuminated), as well as luminescence of the light transmission when the light source is illuminated. In alternative embodiments, a pigment is added to impart translucent color.

Metalized layer 105 is deposited onto a portion or all of first coating(s) 103 by conventional methods such as vapor deposition or vacuum metallization to form a layer having a thickness preferably from about 0.01 mm to about 0.08 mm. The term "metal" is defined in the usual manner as any of various opaque, fusible, ductile and typically lustrous substances that are good conductors of electricity and heat. The metal layer of the present invention includes at least one metal, such as, for example, aluminum, silver, gold, platinum, zinc, copper, nickel, tin, silicon, chrome, and alloys and mixtures thereof. Deposition of the metal layer is accomplished by vacuum, plating, and/or other deposition methods well-known in the art, including, e.g., chemical vapor deposition, physical vapor deposition, sputtering, electroplating, chrome plating, etc., or combination thereof.

One or more pigmented top layers 107 are then formed over all or a portion metalized layer 105. Top layer(s) can include a resin such as a UV, e-beam, or other radiation curable resins or coatings. Top layer(s) 107 are generally translucent such that metalized layer 105 is viewable therethrough, yet the pigments impart color to metalized layer 105 such that it has the effect of a colored or tinted foil layer.

In some embodiments, the plastic material of barrel 102 can comprise a whitening agent, such as titanium dioxide ($TiO_2$), in an amount of from about 1 to 5 weight %, and more particularly, from about 2 to 4 weight %. In some embodiments, the plastic material of barrel 102 can additionally or alternatively comprise optical diffusion agents and/or optical brightening agent(s), in a similar amount as the whitening agents. The optical brightening agents can comprise, for example, optical brighteners commercially available from BGT Hi-tech Chemical of Tianjin, China, including, for example, optical brightening agents OB (2,2-(2,5-Thiophenediyl) Bis[5-(1,1-dimethylethy)] Benzoxazole or $C_{27}H_{27}O_2N_2S$), OB-1 (2,2-(1,2-Ethenediyldi-4,1-phenylene) bisbenzoxazole or $C_{28}H_{18}N_2O_2$), KCB (Benzoxazolyl Naphthalene brightener), KSN (4-(5-Methylbenzoxazol-2-yl)-4'-(benzoxazol-2-yl)-stilbene), FP (1,1'-biphenyl-4,4'-bis-benzoxazole), and/or CBS-X (sodium salt of 4,4-bis(2-disulfonic acid styryl)biphenyl or $C_{28}H_{18}O_6S_2Na_2$), fluorescent brightener VBL (bis (triazinylamino) stilbene derivative), or any combination thereof. The optical brighteners work by absorbing UV radiation while remitting blue light to reduce yellow coloring of polymeric materials, such as the plastic material of barrel 102. When used with a whitening agent the optical brightener will produce a brilliant white appearance. The optical brightening and/or whitening agents can be added to the plastic during molding/casting in either dry powder or pellet form, or suspended or dissolved in a liquid carrier, resin, or solvent. The diffusion agents act to spread, scatter or diffuse light to produce a soft light appearance with high transmission, and can comprise, for example inorganic silicone beads, organic polymer beads, or similar materials.

The whitening diffusion, and/or brightening agents enhance the daylight effect of the engraving (i.e. the appearance of the engraving when the light source is not illuminated or powered on) as depicted in FIG. 1, as well as the luminescence of the light transmission when the light source is illuminated or powered on, as depicted in FIGS. 2 and 3. Furthermore, the whitening additive can provide flame retardant properties to the plastic substrate to eliminate or reduce the occurrence of charring and/or bubbling of the plastic substrate due to heat generated during laser engraving. In other embodiments, other flame retarding compounds are also included in the plastic material.

Figure 4:
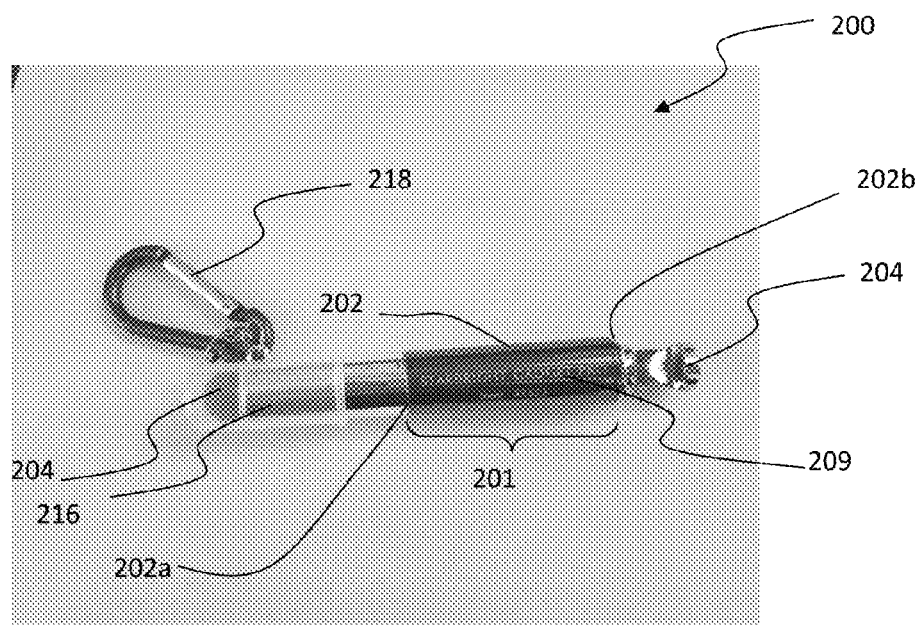
FIG. 4 is a perspective view of a metalized, laser-engraved promotional stylus pen with a light source according to another embodiment of the invention.
Figure 5:
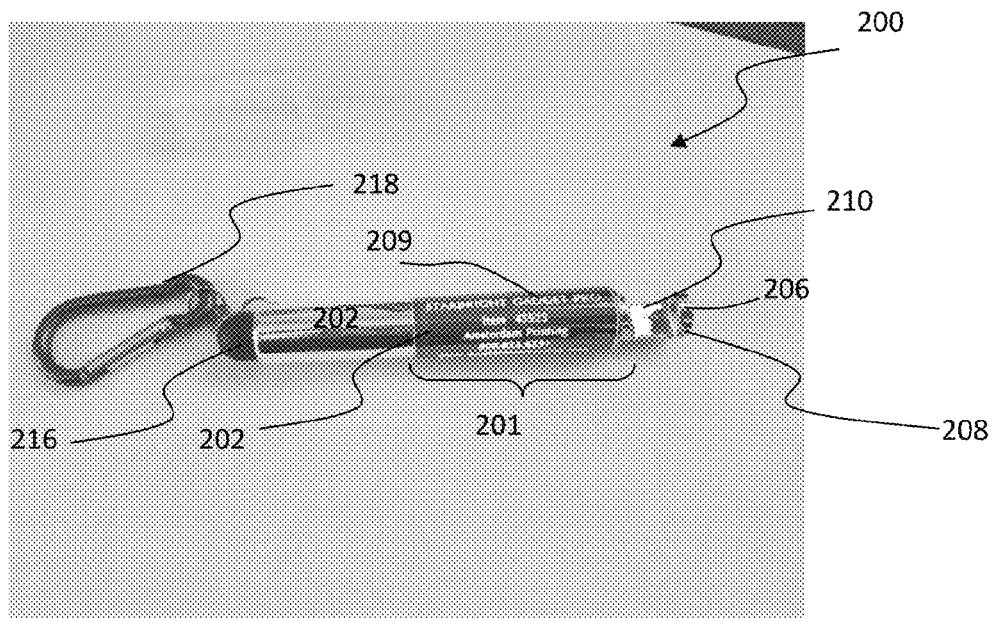
FIG. 5 is a perspective view of the promotional item of FIG. 4 with the light source illuminated.
Figure 6:
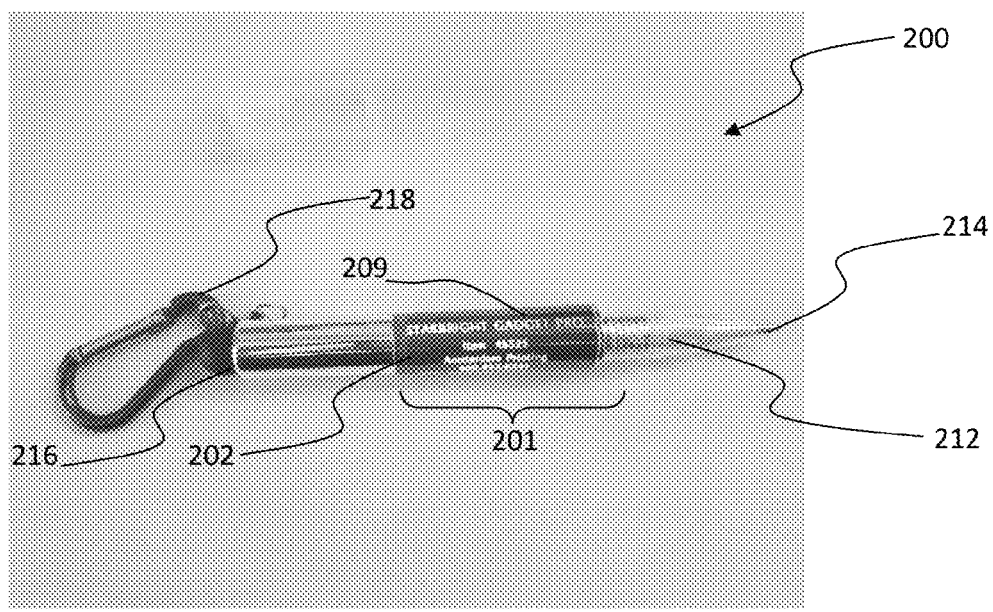
FIG. 6 is a perspective view of the promotional item of FIG. 4 with the light source illuminated and the writing tip in a usable position.

Referring now to FIGS. 4-6, in an alternative embodiment, item 200 comprises a multi-functional pen having a laser-engraved metalized surface 201, and a light source (not shown). Referring to FIG. 4, pen 200 includes a barrel 202 having a proximal end 202a and a distal end 202b. The light source, as described above with respect to the embodiment of FIGS. 1-3, can be positioned within an interior of barrel 202, such as at distal end 202b.

All or a portion of barrel 202, similarly formed as barrel 102, can comprise laser-engraved metalized surface 201 with engravings 209, similar in structure to laser-engraved metalized surface 101 depicted in FIG. 7. The whitening agent(s), diffusion agent(s), and/or brightening agent(s) included in barrel 202 and optional first layer(s) 103 of surface 101, enhance the daylight effect of the engraving (i.e. the appearance of the engraving when the light source is not illuminated) as depicted in FIG. 4, as well as the luminescence of the light transmission when the light source is illuminated, as depicted in FIGS. 5 and 6. Furthermore, as discussed above, the whitening additive can provide flame retardant properties to the plastic substrate to eliminate or reduce the occurrence of charring and/or bubbling of the plastic substrate due to heat generated during laser engraving. In other embodiments, other flame retarding compounds are also included in the plastic material.

Referring now to FIGS. 4 and 5, proximal end 202a is sized to fit a functional end cap 204. As depicted in FIGS. 4 and 5, end cap 204 is depicted in a first position in which a writing instrument (not shown) in housed within an interior of barrel 202, and a smart phone stand 206 extends from barrel 202. Smart phone stand 206 generally comprises a structure 208 having a notch 210 extending through a middle portion of structure 208, which is sized to hold a smart phone via friction fit so that the smart phone can stand on an edge.

Referring to FIG. 6, when functional end cap 204 is flipped such that smart phone stand 206 is housed within the interior of barrel 202, a writing instrument 212 including a writing tip 214 extends from proximal end 202a. Writing instrument 212 can comprise, for example, a conventional ball point pen or other suitable writing instrument.

Distal end 202b can comprise a stylus 214 for use on a capacitive touch screen, such as a smart phone or tablet, and a cap 216. Alternatively, distal end 202b can comprise any of a variety of buttons, plungers, erasers, styli, carabineers, clips, or a smart phone stand. Pen 200 can further comprise any of a variety of optional clips, carabineers 218, grips, and the like, or combinations thereof.

Referring now to FIG. 8, a method 1000 of making a laser-engraved metalized promotional item includes a first step at 1002 of forming a rigid body of the item. For sake of simplicity, the body will be referred to as a barrel of a pen; however one of ordinary skill in the art would recognize any of a variety of items can be formed. The barrel is formed from the plastic material described above, with or without flame retardants and/or whitening agents. The barrel can be formed by blow molding, injection molding, extruding, or any of a variety of plastic forming techniques know in the art.

At step 1004, the first coating(s), such as a curable resin, is applied and heated until the resin is smooth. The resin can be applied, for example, by spray coating, curtain coating, or the like. Once the resin is smooth, it can be hardened or cured by appropriate methods, such as, for example, UV radiation in the instance of a UV curable coating, is applied at the appropriate wavelengths and residence time to cure or crosslink the coating until maximum curing is obtained and the resin is no longer tacky.

At step 1006, the barrel and first coating are metalized such as by vacuum deposition, including physical and/or vapor deposition, to form a continuous metalized layer over the first coating(s).

At step 1008, one or more pigmented layers, such as a UV resin containing pigment, are applied over the metalized layer, such as by spray coating, curtain coating, or the like. The resin is optionally heated to smooth the resin. Once the resin is smooth, the resin can be hardened or cured by appropriate methods such as UV radiation in the instance of a UV curable coating, is applied at the appropriate wavelengths and residence time to cure or crosslink the coating until maximum curing is obtained and the resin is no longer tacky.

At step 1010, any of a variety of accessories is assembled onto and/or into the barrel, such as, for example, the lighting source and optional battery (if battery powered), writing instruments, styli, clips, grips, carabineers, caps, and the like.

At step 1012, the metalized outer surface is laser engraved using a fiber optic laser, or other conventional lasers, set to a desired wavelength and intensity to achieve sharp edges at a desired depth. The engraving can be any of a variety of indicia uploaded to a computer for reading by the laser. As discussed previously with respect to FIG. 7, laser engravings can extend entirely through the pigmented layer(s) and the metalized layer, and through portions or all of the first layer(s), so as to protect the underlying barrel material from being ablated and/or charred. One of skill in the art would recognize that the laser engraving of step 1012, can be performed before and/or after final assembly of the article.

In use, the recipient can illuminate the engravings by activating a switching device accessible on the barrel of the item. For example, the light source is powered on and off by depressing the flexible stylus if present. Advertising or other messages created by laser engraving the metalized surface of the promotional item are enhanced due to the illumination of the laser engraving. Furthermore, the enhanced plastic substrate in combination with the coatings against the contrast of the metalized surface as described herein provides an enhanced or brighter daylight appearance, i.e. when the light source is powered down or off.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A back-lightable laser-engraved metalized item comprising:
   a hollow or partially filled body formed of a plastic material, an outer surface of the body having a metalized surface formed thereon, the metalized surface including—
      a first resin layer(s) covering a portion of the outer surface of the body,
      a metalized layer covering at least a portion of the first resin layer(s), and
      one or more pigment layers covering at least a portion of the metalized layer;
   structure defining engravings formed in the metalized surface such that the plastic material of the body is viewable therethrough, wherein at least one of the engravings does not extend entirely through the metalized surface to the outer surface of the plastic body; and
   a light source housed within an interior of the body, the light source being shiftable between an unpowered configuration and a powered configuration in which light is transmitted from the light source and through the engravings, thereby illuminating the engravings.

2. The back-lightable laser-engraved metalized item of claim 1, wherein the first resin layer(s) comprises a UV cured resin.

3. The back-lightable laser-engraved metalized item of claim 2, wherein the first resin layer(s) further comprises a whitening agent.

4. The back-lightable laser-engraved metalized item of claim 3, wherein the whitening agent comprises a fluorescent whitener in an amount of about 1 to about 8 weight percent.

5. The back-lightable laser-engraved metalized item of claim 4, wherein the fluorescent whitener is present in an amount of about 2.5 to about 6.5 weight percent.

6. The back-lightable laser-engraved metalized item of claim 1, wherein the metalized layer comprises a vacuum deposited metal layer.

7. The back-lightable laser-engraved metalized item of claim 1, wherein the metalized layer comprises aluminum, silver, gold, platinum, zinc, copper, nickel, tin, silicon, alloys thereof, or mixtures thereof.

8. The back-lightable laser-engraved metalized item of claim 1, wherein the metalized layer comprises aluminum or aluminum alloy.

9. The back-lightable laser-engraved metalized item of claim 1, wherein the one or more pigment layers comprise UV curable resins containing pigment.

10. The back-lightable laser-engraved metalized item of claim 1, wherein the plastic material is selected from the group consisting of: acrylonitrile butadiene styrene (ABS), acrylonitrile styrene (AS), cellulose acetate butyrate (CAB), polycarbonate (PC), polyethylene terephthalate (PET), polyethylene (PE) including high density polyethylene (HDPE)

and low density polyethylene (LDPE), polyvinyl chloride (PVC), polypropylene (PP), polystyrene (PS), or combinations thereof.

11. The back-lightable laser-engraved metalized item of claim 10, wherein the plastic material further comprises a whitening agent, flame retardant, or combinations thereof.

12. The back-lightable laser-engraved metalized item of claim 11, wherein the plastic material comprises a whitening agent, wherein the whitening agent comprises titanium dioxide present in an amount of about 1 to about 5 weight percent.

13. The back-lightable laser-engraved metalized item of claim 12, wherein the titanium dioxide present in an amount of about 2 to about 4 weight percent.

14. The back-lightable laser-engraved metalized item of claim 1, wherein the lighting source comprises an LED, fiber optic light, incandescent light, fluorescent light, ultra-violet light, or combinations thereof.

15. The back-lightable laser-engraved metalized item of claim 14, wherein the lighting source comprises a battery-powered LED.

16. The back-lightable laser-engraved metalized item of claim 1, wherein the item comprises a pen, a stylus, a stylus pen, a highlighter, a key chain, a night-light, a mini-flashlight, a mini-penlight, a portable power bank, or a device charger.

17. The back-lightable laser-engraved metalized item of claim 16, wherein the item comprises a pen, wherein the body comprises an elongate pen barrel having a first end including a writing instrument, and a second opposite end, and wherein the light source is positioned within the pen barrel proximate the second end.

18. The back-lightable laser-engraved metalized item of claim 1, wherein at least one of the engravings extends through the one or more pigment layers, metalized layer, and only partially through the first resin layer(s).

19. A back-lightable engraved item comprising:
a hollow or partially filled body formed of a plastic material;
a surface imparting a metalized appearance formed on at least a portion of an outer surface of the body;
structure defining engravings formed in the surface such that the plastic material of the body is viewable therethrough, wherein at least one of the engravings does not extend through to the outer surface of the plastic body; and
a light source housed within an interior of the body, the light source being shiftable between an unpowered configuration and a powered configuration in which light is transmitted from the light source and through the engravings, thereby illuminating the engravings.

20. The back-lightable engraved item of claim 19, further comprising one or more pigment layers covering at least a portion of the surface.

21. The back-lightable engraved item of claim 20, wherein the surface imparting the metalized appearance comprises aluminum, silver, gold, platinum, zinc, copper, nickel, tin, silicon, alloys thereof, or mixtures thereof.

22. The back-lightable engraved item of claim 19, wherein the surface imparting the metalized appearance comprises aluminum or aluminum alloy.

23. The back-lightable engraved of claim 19, wherein the plastic material is selected from the group consisting of: acrylonitrile butadiene styrene (ABS), acrylonitrile styrene (AS), cellulose acetate butyrate (CAB), polycarbonate (PC), polyethylene terephthalate (PET), polyethylene (PE) including high density polyethylene (HDPE) and low density polytethylene (LDPE), polyvinyl chloride (PVC), polypropylene (PP), polystyrene (PS), or combinations thereof.

24. The back-lightable engraved of claim 23, wherein the plastic material further comprises a whitening agent, flame retardant, or combinations thereof.

25. The back-lightable engraved of claim 23, wherein the plastic material comprises a whitening agent, wherein the whitening agent comprises titanium dioxide present in an amount of about 1 to about 5 weight percent.

26. The back-lightable engraved of claim 25, wherein the titanium dioxide present in an amount of about 2 to about 4 weight percent.

27. The back-lightable engraved of claim 19, wherein the lighting source comprises an LED source, fiber optic light, incandescent light, fluorescent light, ultra-violet light, or combinations thereof.

28. The back-lightable engraved of claim 19, wherein the engravings extend only partially through the surface imparting the metalized appearance.

* * * * *

UNITED STATES PATENT AND TRADEMARK OFFICE
CERTIFICATE OF CORRECTION

PATENT NO. : 10,030,839 B2
APPLICATION NO. : 15/353007
DATED : July 24, 2018
INVENTOR(S) : Casciotti et al.

It is certified that error appears in the above-identified patent and that said Letters Patent is hereby corrected as shown below:

In the Claims

Claim 21, Column 10, Line 12:
Delete "20" and insert --19--.

Signed and Sealed this
Ninth Day of October, 2018

Andrei Iancu
*Director of the United States Patent and Trademark Office*